C. I. FILSON.
FUEL FEEDING MECHANISM FOR FURNACES.
APPLICATION FILED APR. 11, 1914.
1,134,600.
Patented Apr. 6, 1915.
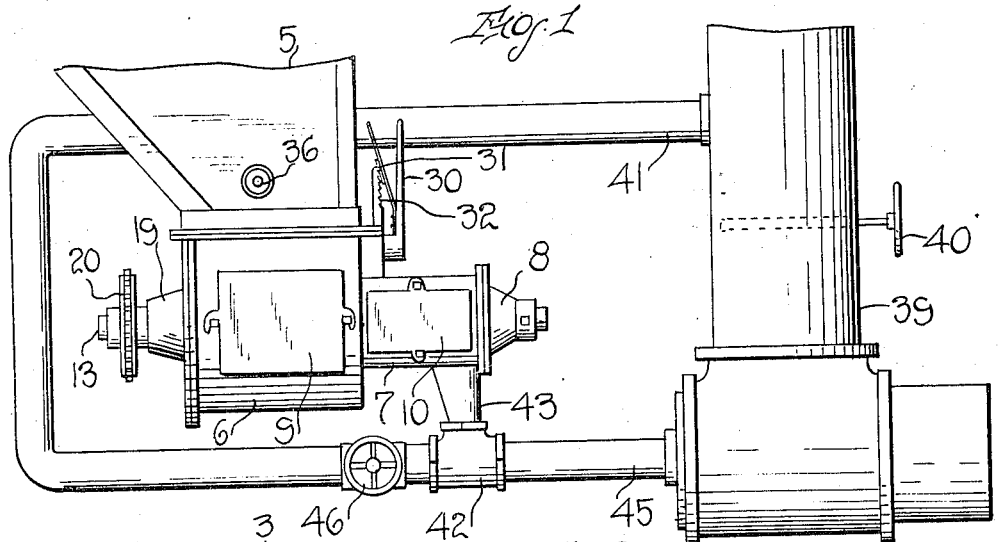
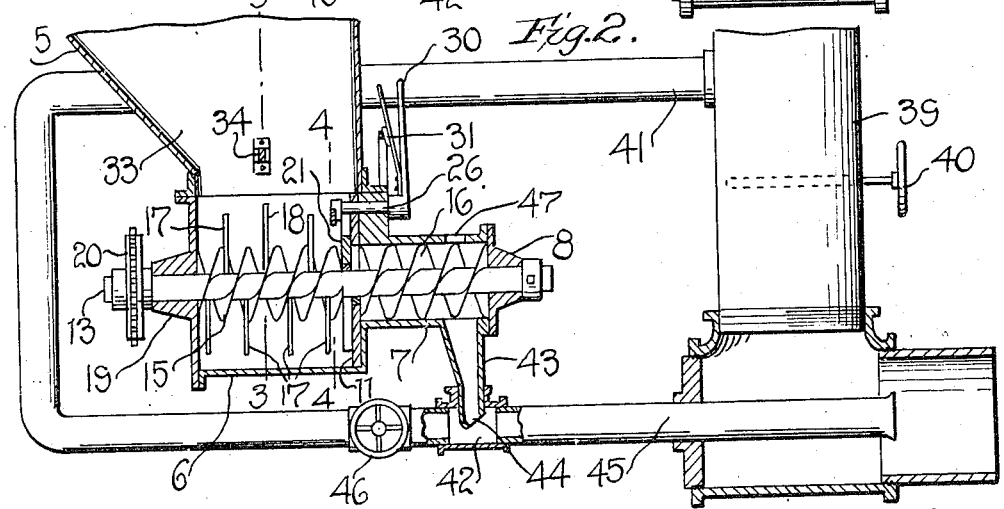
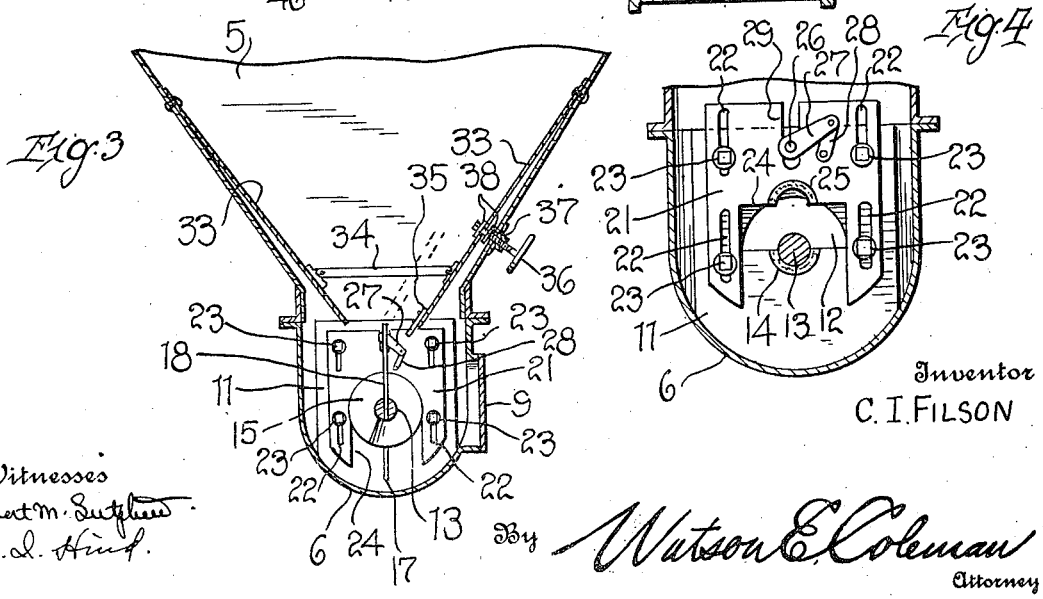
Witnesses
Robert M. Sutphen
A. L. Hind
Inventor
C. I. Filson
By Watson E. Coleman
Attorney

UNITED STATES PATENT OFFICE.

CHARLES I. FILSON, OF BURNHAM, PENNSYLVANIA.

FUEL-FEEDING MECHANISM FOR FURNACES.

1,134,600.       Specification of Letters Patent.       Patented Apr. 6, 1915.

Application filed April 11, 1914. Serial No. 831,230.

*To all whom it may concern:*

Be it known that I, CHARLES I. FILSON, citizen of the United States, residing at Burnham, in the county of Mifflin and State of Pennsylvania, have invented certain new and useful Improvements in Fuel-Feeding Mechanism for Furnaces, of which the following is a specification, reference being had to the accompanying drawings.

This invention relates to fuel feeding mechanism for furnaces and has for its primary object to provide improved means for maintaining a uniform feed of coal or other fuel in powdered form to the furnace and mixing the same intimately with an air blast whereby perfect combustion results.

The present invention has for its principal object to provide simple and effective means for regulating the feed of the fuel to the furnace, and maintaining such feed without variation in proper proportion to the air which is mixed therewith.

My invention has for a further general object to simplify the construction of mechanism of the above character, whereby its reliability in practical use is assured under varying conditions of the powdered coal or other fuel, while at the same time, the invention may be produced at small manufacturing cost.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1 is a side elevation illustrating the preferred embodiment of my invention. Fig. 2 is a vertical section. Fig. 3 is a section taken on the line 3—3 of Fig. 2. Fig. 4 is a section taken on the line 4—4 of Fig. 2.

In all automatic feeding mechanisms for furnaces, with which I am acquainted, variable speed regulators are provided for the rotating conveyer, and the use of such regulators results in a material disadvantage in the operation of the device, in that the same causes an intermittent flow of the fuel to the furnace, when the conveyer is rotated at a slow or medium speed. As a constant flow of air is provided, it is obvious that the disproportion between the volume of air supplied and the quantity of fuel owing to such intermittent feed results in a material decrease in the heating capacity of the furnace and occasions a waste of the fuel. This is due to the fact that the air entering the combustion chamber of the furnace without sufficient fuel accompanying the same, chills the combustion chamber and destroys the heating effect of the relatively small quantity of fuel which is delivered to said chamber. On the other hand, it will be manifest from what has been above stated, that when the fuel is delivered to the furnace in a uniform uninterrupted flow and intimately mixed with air in proper proportion, perfect combustion takes place and a heat of great intensity is produced. Thus material economy is effected in the consumption of the fuel. For instance, I have determined by practical tests that the mechanism to be hereinafter described in detail operates successfully hen the rotary conveyer is driven at a speed of from two hundred to four hundred revolutions per minute, means being provided whereby the feed of fuel to the furnace through the medium of the conveyer may be regulated from one half to twenty pounds per minute, or even more, if required.

Referring in detail to the accompanying drawings, wherein I have illustrated a fuel feeding mechanism for successfully accomplishing the above mentioned purpose, 5 designates a suitable hopper, of gradually decreasing cross sectional area from its upper to its lower discharge end, and 6 indicates a housing or casing which is secured to the latter end of the hopper. This casing is provided upon one end with a reduced laterally projecting conveyer housing 7, the outer end of which is equipped with a removable bearing cap 8. The casing 6 and the housing 7 are provided with suitable doors indicated at 9 and 10 respectively whereby access may be had to the interior.

A vertically disposed plate 11 is secured within the casing 6 at the end from which the housing 7 projects. This plate is provided with a semi-circular opening 12 extending above the center of the plate, the lower edge of said opening extending transversely of the casing 6 and being centrally provided with a recess for the accommodation of the conveyer shaft 13. In the shaft receiving recess, a semi-circular packing strip or washer 14 preferably of reinforced felt is arranged.

The shaft 13 is provided with two sets of double spiral flight blades indicated at 15 and 16 respectively. It is however, to be understood that if desired, a single flight blade may be used or any other form of conveyer employed. Upon that section of the shaft 13 which is provided with the blades 15, a plurality of radially disposed agitating rods 17 are secured, one of said rods indicated at 18 being of greater length than the remaining rods. One end of the shaft 13 is journaled in a suitable bearing provided upon the cap 8 while the other end of the shaft is journaled in a bearing extension 19 provided upon one end of the casing 6, said shaft extending beyond this latter bearing and being equipped with a sprocket wheel or gear indicated at 20 through the medium of which said conveyer is driven.

An adjustable feed regulating plate 21 is arranged upon the stationary plate 11 in the end of the casing 6, said plate being provided adjacent its opposite edges with spaced elongated slots 22 to receive the bolts 23 securing the plate 11. The lower central portion of the adjustable plate 21 is cut away or recessed as at 24, the upper edge of said recess being provided with a semi-circular notch or seat for the upper portion of the conveyer shaft 13, said seat having a packing strip or washer 25 arranged therein similar to the felt packing strip 14. These plates 11 and 21 are arranged between the two sets of spiral conveyers on the shaft 13. In the end of the casing 6, a short shaft 26 is mounted. This shaft is provided upon its inner end with an arm 27 which is connected by means of a link 28 to the vertically movable plate 21. The upper edge of this plate has a notch 29 formed therein to accommodate the shaft 26. The outer end of said shaft is provided with a lever 30 whereby the shaft 26 may be rocked, said lever carrying a latch member 31 for engagement with the teeth of a rack 32 mounted upon the casing 6. It will be apparent from this construction that when the plate 21 is in its lowermost position, the feed of the material from the casing 6 to the conveyer flight 16 is entirely cut off. By manipulating the lever 30, said plate may be raised to a greater or less extent so as to permit the material to be forced through the portion of the opening 12 which is uncovered by the plate 21, and discharged by the conveyer 16 into the air blast conduit or pipe to be hereinafter referred to.

In order to insure a positive and continuous feed of the coal even when the same is in a damp and packed condition, I provide the vibrating plates 33 which are secured at their upper ends to the opposed inclined walls of the hopper 5. These plates at their lower ends are pivotally connected by means of a link bar 34. To the lower edge of one of said plates, a lug 35 is secured and is adapted to be engaged by the relatively long agitator rod 18 on the conveyer shaft 13. The plates 33 may be adjusted so as to dispose the lug 35 in position for engagement by said agitator rod through the medium of the threaded adjusting screw 36 which is engaged in an interiorly threaded sleeve 37 secured to the exterior of one of the hopper walls. The inner end of this screw is provided with spaced collars or washers 38 which are arranged upon opposite sides of the plate 33, said collars being spaced sufficiently to permit of the movement of the plate 33 upon the adjusting screw. In order to dispose the lug 35 on the plate 33 in position for engagement by the agitator rod 18, the screw 36 is turned to force said plate inwardly. In the rotation of the conveyer, the rod 18 engaging the lug 35 springs or flexes the plate 33, the other of said plates being also moved through the medium of the connecting link 34. Thus the coal in the hopper 5 is agitated and its movement downwardly into the casing 6 assured.

An air blast pipe 39 is provided with a regulating valve 40 whereby the volume of air delivered to the furnace may be controlled and varied as desired. A coal delivery air pipe 41 is connected to the blast pipe above the valve 40. This latter pipe is equipped with a coupling head 42 to which the lower end of a discharge spout 43 projecting downwardly from the outer end of the conveyer housing 7, is connected, said spout extending through the nipple of the coupling member and having its end curved as indicated at 44 toward the blast pipe 39. A pipe section 45 is also connected to the coupling head 42 and extends into the lower end of said blast pipe. The air pipe 41 adjacent to the discharge spout 43 is preferably provided with a suitable valve 46 so that the volume of air passing through said pipe for mixture with the fuel, may be regulated. The top wall of the conveyer housing 7 is provided with an opening indicated at 47 whereby a vacuum is created by the air passing through the pipe 41 and air is drawn through the opening 47 downwardly through the discharge spout 43, thus creating a suction and preventing the air blast from passing upwardly through the outlet or discharge 43. In this manner, the coal or other fuel which is fed by the conveyer 16 is positively drawn downwardly into the pipe 41 and intermixed with the air blast passing through said pipe. Thus a uniform flow of the fuel to the fuel delivery blast is maintained, and the volume of air may be regulated in proportion to the quantity of fuel delivered by the conveyer 16, by simply adjusting the valve 46.

From the foregoing description taken in connection with the accompanying drawings, it is believed that the construction, manner of operation and several advantages of my invention will be clearly and fully understood. By the provision of the adjustable feed regulating plate 21, the quantity of fuel fed to the air blast pipe may be regulated without changing the speed of operation of the conveyer. In this manner, an uninterrupted uniform flow of the fuel is obtained so that it is at all times delivered in proper proportion to the volume of air, to the combustion chamber of the furnace. By means of my invention, I therefore effect considerable economy in the consumption of fuel and am enabled to obtain perfect combustion. By connecting the pipe 41 to the blast pipe 39 above the valve in said latter pipe, the volume of air entering the pipe 41 and directly into the combustion chamber through the pipe 39 may be regulated with respect to each other, as desired. It will be apparent that by means of the fuel feeding mechanism constructed in the manner above explained, I have entirely overcome the deficiencies existing in prior devices of an analogous character hereinbefore enumerated. At the same time, my improved mechanism is comparatively simple in its construction, positive and reliable in operation and may be produced at small manufacturing cost.

While I have shown and described the preferred construction and arrangement of the several elements, it will be understood that the invention is susceptible of considerable modification and I therefore reserve the privilege of resorting to all such legitimate changes as may be fairly embodied within the spirit and scope of the invention as claimed.

Having thus described the invention, what is claimed is:

1. In a fuel feeding mechanism, a hopper, a casing on the lower end of said hopper, a shaft mounted in said casing, spaced conveyers on said shaft, a stationary plate arranged within the casing between the conveyers and provided with an opening above the conveyer shaft, a second plate slidably mounted upon the inner face of said stationary plate and also having an opening to coöperate with the opening in the stationary plate and determine the amount of fuel delivered by one conveyer to the other, said movable plate being also adapted for engagement upon the shaft to entirely cut off the feed of the fuel, a manually operable shaft mounted in the wall of said casing, and means located within the casing and connecting said shaft to the movable plate whereby the latter may be actuated to dispose the opening therein with respect to the opening in the stationary plate.

2. In a fuel feeding mechanism, a hopper, a casing on the lower end of said hopper, a shaft mounted in said casing, spaced conveyers on said shaft, a stationary plate mounted in the casing between said conveyers and provided with an opening, a plate slidably mounted upon the stationary plate and adjustable over said opening to regulate the quantity of fuel delivered by one conveyer to the other, a shaft mounted in the wall of said casing, an arm fixed on one end of said shaft, a link connecting said arm to the adjustable plate, and a lever fixed upon the other end of said shaft whereby the same may be actuated to adjust the plate.

In testimony whereof I hereunto affix my signature in the presence of two witnesses.

CHARLES I. FILSON.

Witnesses:
   HARRY ROWLEY,
   HARVEY BENNETT.